Dec. 26, 1944.     F. S. GREENE     2,365,949
SIGNALING SYSTEM
Original Filed July 13, 1942     6 Sheets-Sheet 1

INVENTOR
Frank S. Greene
BY
Evans + McCoy
ATTORNEYS

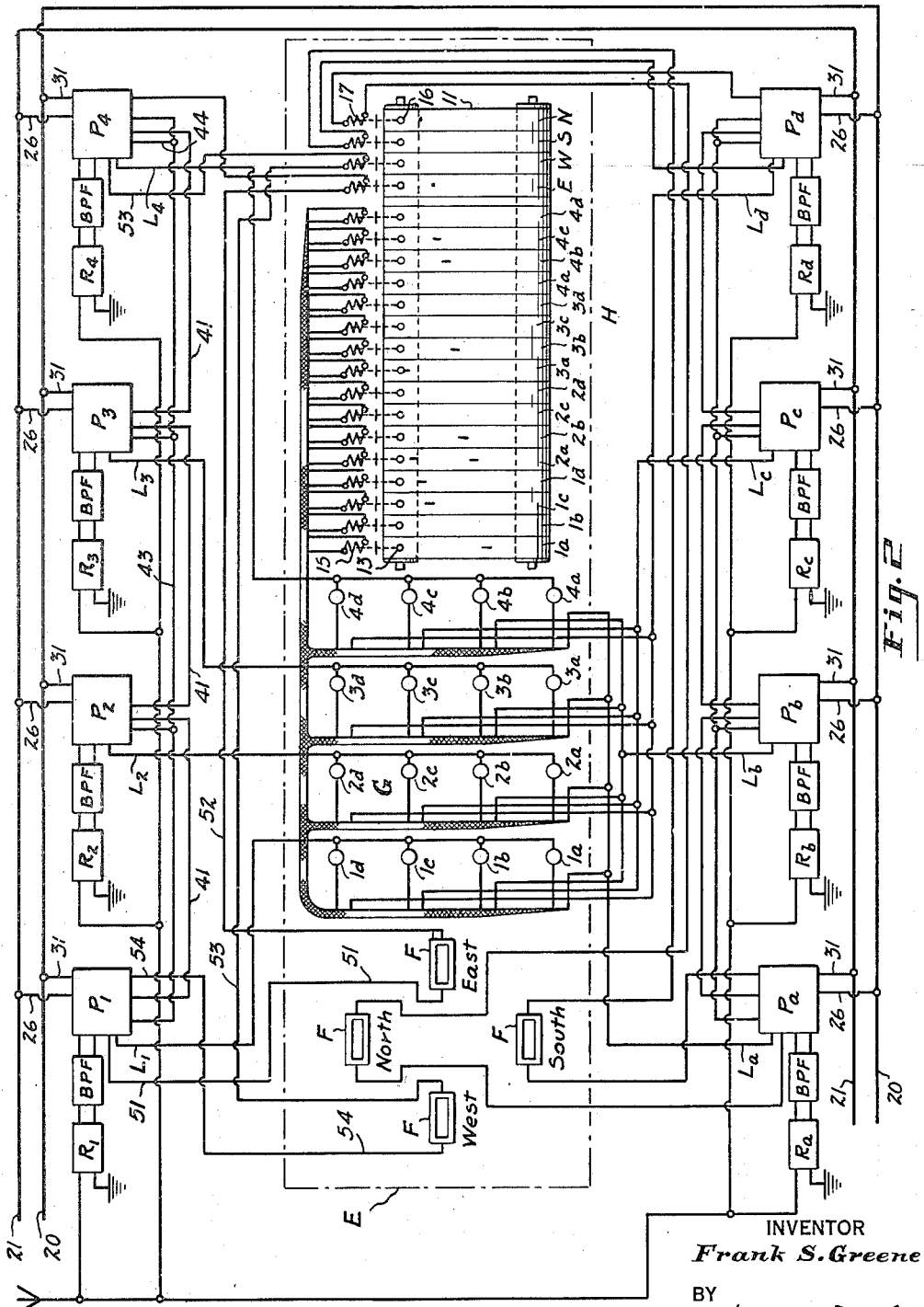

Dec. 26, 1944.  F. S. GREENE  2,365,949
SIGNALING SYSTEM
Original Filed July 13, 1942   6 Sheets-Sheet 3
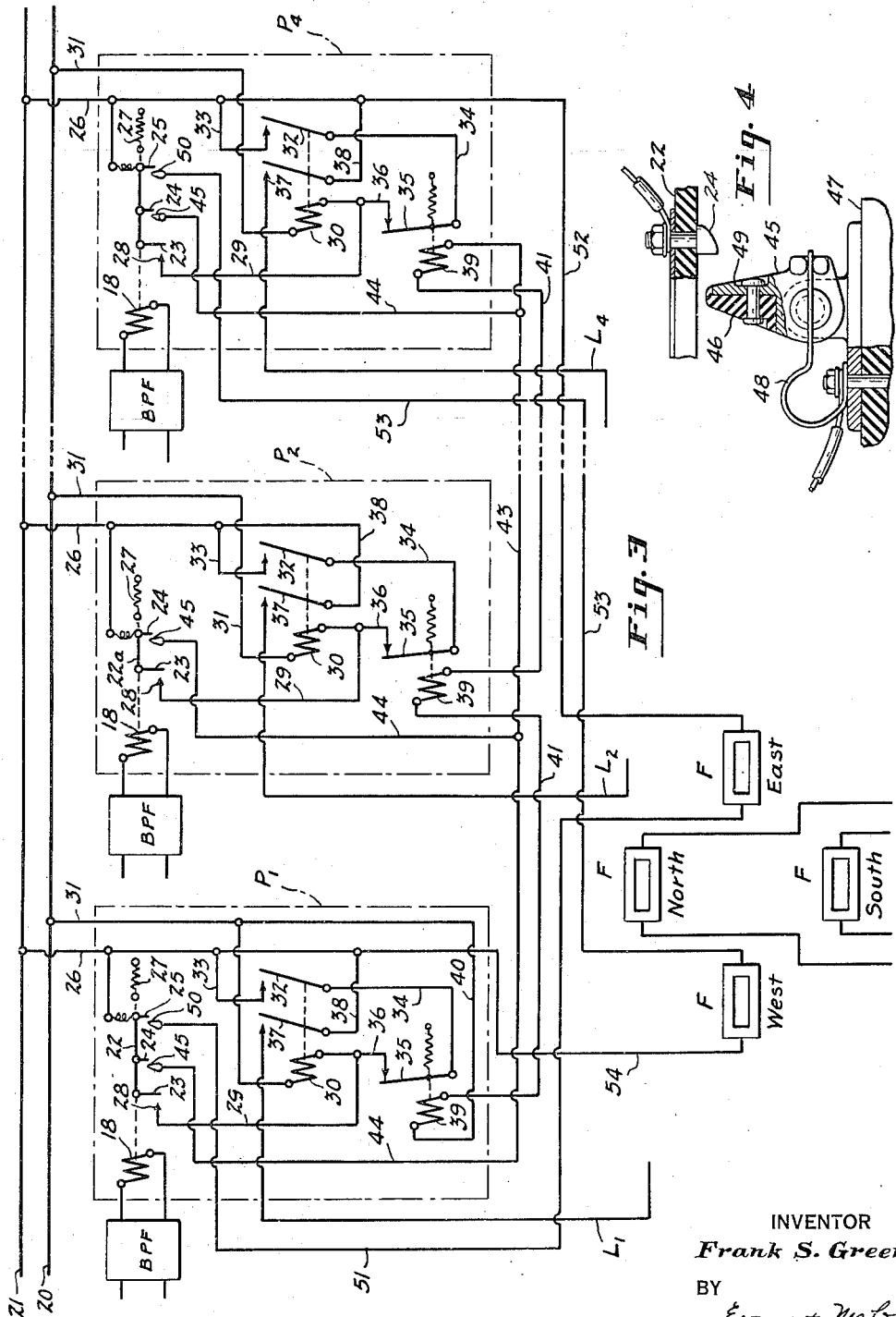
INVENTOR
*Frank S. Greene*
BY
*Evans + McCoy*
ATTORNEYS Dec. 26, 1944. F. S. GREENE 2,365,949
SIGNALING SYSTEM
Original Filed July 13, 1942   6 Sheets-Sheet 4

INVENTOR
Frank S. Greene
BY
Evans + McCoy
ATTORNEYS

Dec. 26, 1944.   F. S. GREENE   2,365,949
SIGNALING SYSTEM
Original Filed July 13, 1942   6 Sheets-Sheet 5

INVENTOR
Frank S. Greene
BY
Evans & McCoy
ATTORNEYS

Dec. 26, 1944.   F. S. GREENE   2,365,949
SIGNALING SYSTEM
Original Filed July 13, 1942   6 Sheets-Sheet 6
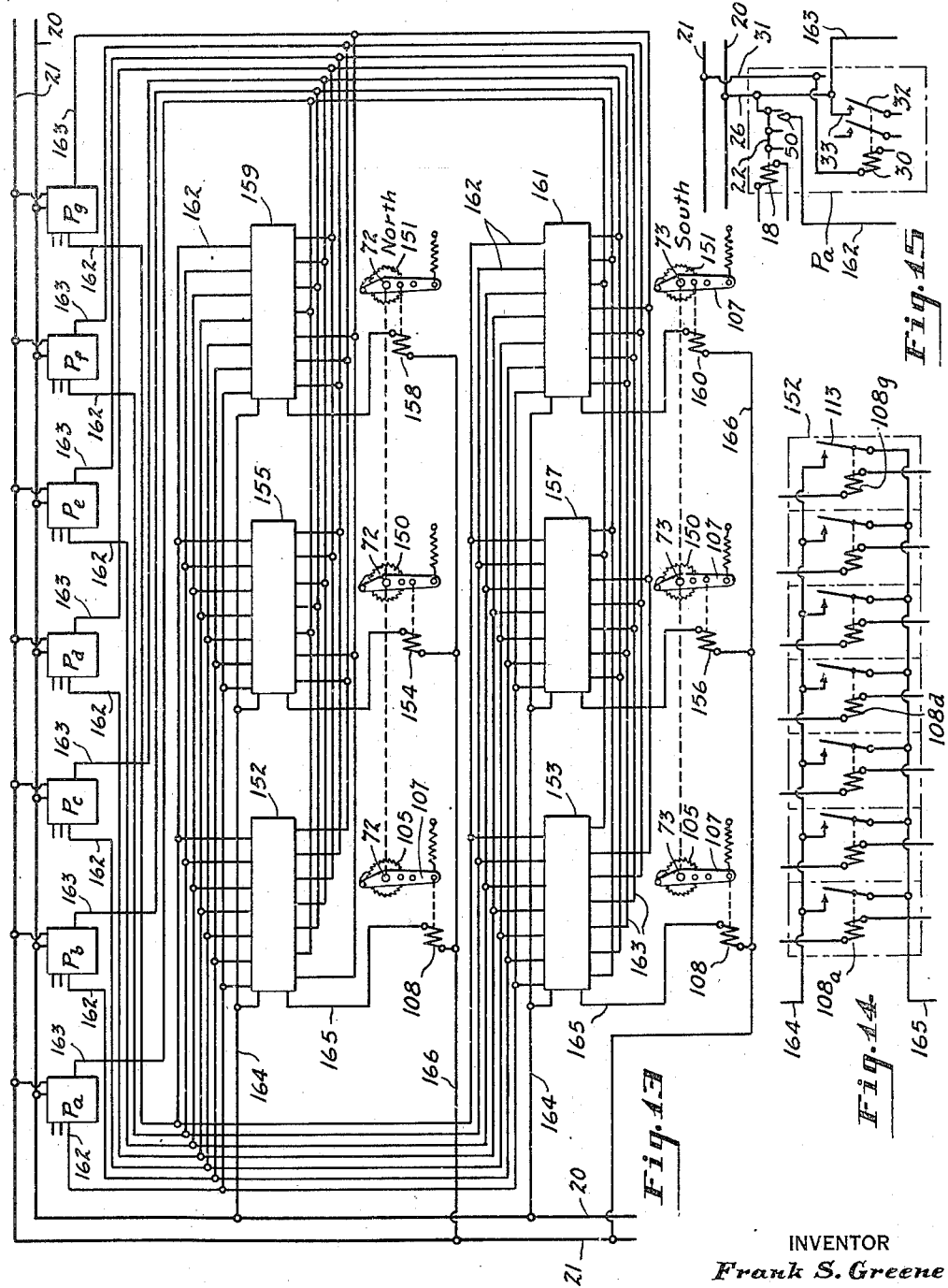
INVENTOR
*Frank S. Greene*
BY
*Evans & McCoy*
ATTORNEYS Patented Dec. 26, 1944

2,365,949

UNITED STATES PATENT OFFICE 2,365,949

SIGNALING SYSTEM

Frank S. Greene, Cleveland, Ohio, assignor to William M. O'Neil, Cleveland Heights, Ohio Original application July 13, 1942, Serial No. 450,693. Divided and this application October 12, 1943, Serial No. 505,937

26 Claims. (Cl. 250—11)

This invention relates to a method of and apparatus for indicating the location and course of travel of air or water craft, the present application being a continuation in part of application, Serial No. 450,693, filed July 13, 1942.

It is the purpose of the present invention to provide means by which the pilot of a craft traveling within a predetermined geographical area may be informed at all times of the location of the craft and the course over which the craft has traveled.

More specifically, the present invention contemplates the provision of intersecting directional radio beams of different frequencies which are so arranged as to form a checkerwork of intersecting beams over the area within which the craft travels and the use of position and course indicating devices on the craft which are automatically controlled by a series of radio receiving circuits tuned to the frequencies of the radio beams.

With the above and other objects in view the invention may be said to comprise the method and apparatus as illustrated in the accompanying drawings hereinafter described and particularly set forth in the appended claims, together with such variations and modifications thereof as will be apparent to those skilled in the art to which the invention pertains.

Reference should be had to the accompanying drawings forming a part of this specification, in which:

Fig. 2 is a general diagram of the indicating apparatus on the air or water craft which is controlled by the radio beams;

Fig. 3 is a wiring diagram showing the control panel circuits and switches;

Fig. 4 is a detail view of one of the one-way trip switches;

Fig. 13 is a wiring diagram showing means for automatically compensating for failure of one or more of the radio receiving circuits;

Fig. 14 is a wiring diagram of one of the six identical switch panels shown in Fig. 13;

Fig. 15 shows a portion of the wiring of one of the control panels.

Figure 1:
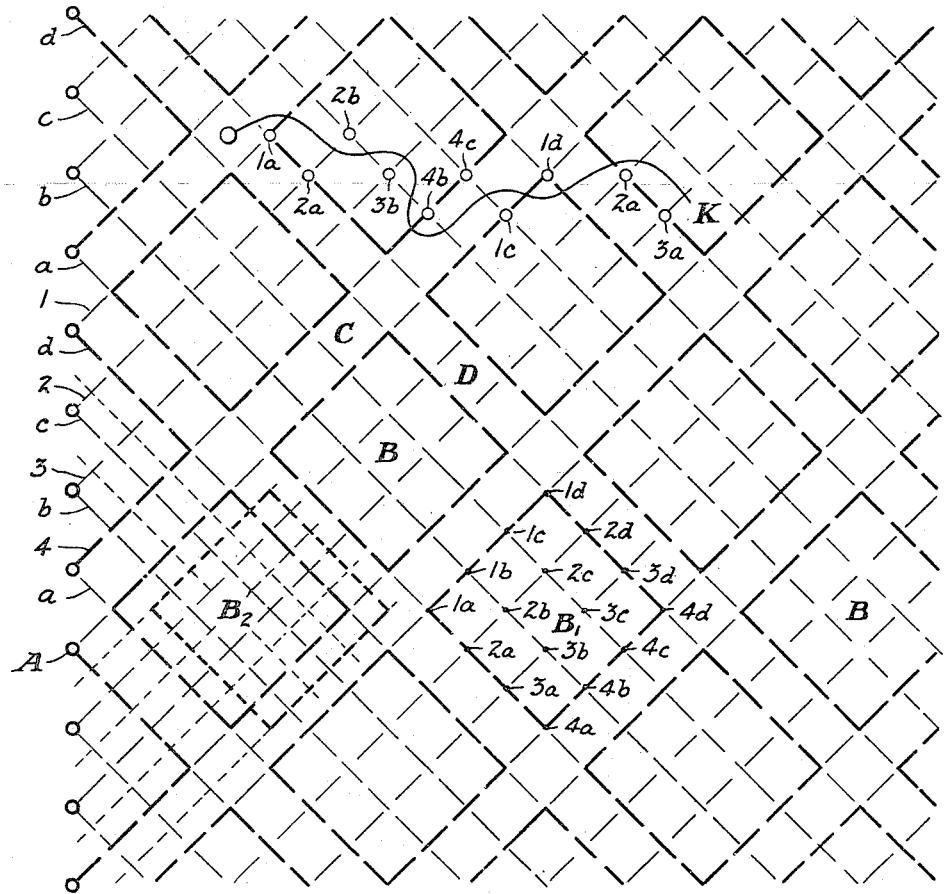
Figure 1 is a diagrammatic view in which the checkerwork of intersecting straight lines indicate two series of radio beams of different frequencies and in which the areas enclosed by heavy lines indicate subdivisions, each of which encloses a group of beam intersections which includes all of the possible frequency combinations.

Figure 1 of the drawings shows a checkerwork of intersecting directional radio beams transmitted from a series of stations A which may be distributed along an edge of the checkerwork area. Assuming that the stations extend in a general north and south direction, the checkerwork may be formed by a series of beams extending northeast and a second series of beams extending southeast. The beams of each series are preferably parallel and uniformly spaced and the stations A may each transmit two diverging beams or a single beam, whichever will permit of the most convenient arrangement of the stations A. Each series of parallel beams will utilize a predetermined number of beam frequencies which recur in regular order. As shown, the northeast beams have four frequencies which are indicated by the numerals 1, 2, 3 and 4, and the southeast beams have four frequencies which are indicated by the letters $a$, $b$, $c$ and $d$. The frequencies 1, 2, 3 and 4 recur in regular order across the checkerwork and the same is true of frequencies $a$, $b$, $c$ and $d$. The lines indicating the beams of frequencies 1, 4, $a$, and $d$ form the border lines of subdivisions B, each of which includes a group of sixteen beam intersections which include each of the possible combinations of frequencies in the intersecting beams which are indicated in the subdivision $B_1$ as $1_a$, $1_b$, $1_c$ and $1_d$, and the same combination of the numerals 1, 2, 3 and 4 with the letters $a$, $b$, $c$, and $d$. The borders of the subdivisions B are indicated by heavy lines and these subdivisions are spaced apart by gaps C which extend northeast and gaps D which extend southeast.

The checkerwork of radio beams serve to energize radio receiving circuits on the air or water craft that are tuned to the frequencies of the radio beams and these receiving circuits are utilized to control three sets of indicating devices mounted on a suitable instrument board E.

As shown in Fig. 2, a set of four counters F serve to register the distance traveled in each of the four directions north, east, south and west. The counters F are selectively controlled to register the number of passages across the gaps D while traveling in a northerly direction, the number of passages across the gaps D while traveling in a southerly direction, the number of passages across the gaps C while traveling in a westerly direction and the number of passages across the gaps C while traveling in an easterly direction. The difference between the numbers registered by the north and south counters gives the distance traveled north or south and the difference between the numbers registered by the east and west counters gives the distance traveled east or west so that the subdivision in which the craft is located may be determined at any time. One of the counters is actuated upon each passage of the craft from one of two parallel border beams to the other without crossing an intermediate beam and the selective actuation of the north and south counters and east and west counters is dependent upon the order in which the circuits tuned to the border beam frequencies are energized.

A set of lamps G arranged in the pattern of the subdivision are controlled by the receiving circuits to successively light the lamps to indicate the position of the craft in the subdivision in which it is traveling.

Figure 5:
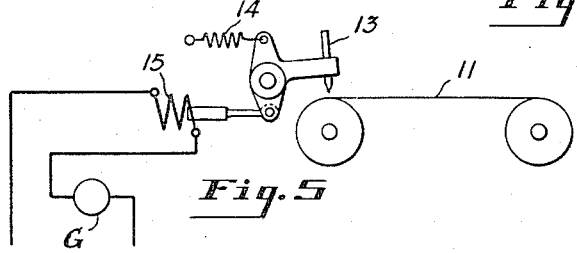
Fig. 5 is a fragmentary view showing one of the stylus operating circuits.

A recording device H controlled by the lamp circuits gives a visible indication of the course of travel of the craft and makes a permanent record thereof. The recording device H comprises a tape 11 exposed through a window opening in the board E. The tape 11 is moved continuously and uniformly by a suitable clock driven device or the like and along an edge of the window opening a row of styluses 13 are mounted. As shown in Fig. 5, each stylus is normally held in a nonengaging position by a spring 14 and is moved into engagement with the tape 11 by means of a solenoid 15 in the circuit of one of the lamps G. Each mark made by the stylus is a permanent record of the position of the craft at the time the mark was made and the succession of marks on the tape will enable the path of the craft to be plotted on a map as indicated at K in Fig. 1. The recording device in addition to giving a visual indication of the path of travel serves to indicate any receiving circuit that is defective and any sending station that is inoperative. It also provides means for accurately determining position even though one or more receiving circuits or one or more sending stations be out of order.

In order to facilitate the reading of the record on the tape 11 and detection of failures of receiving and signaling circuits, four marking devices 16 operated by solenoids 17, one in each counter circuit as shown in Fig. 2 may be provided to indicate on the tape each crossing from one subdivision to another and the direction of such crossing. The receiving circuits are arranged in two groups, one group being tuned to the frequencies $a$, $b$, $c$ and $d$ and designated $R_a$, $R_b$, $R_c$ and $R_d$ and the other group being tuned to the frequencies 1, 2, 3 and 4 and designated $R_1$, $R_2$, $R_3$ and $R_4$. Each receiver has a control panel associated therewith, the panels of one group being designated $P_a$, $P_b$, $P_c$ and $P_d$ and the other group being designated as $P_1$, $P_2$, $P_3$ and $P_4$. The control panels have switches controlling the circuits of the lamps G, each of which is controlled by the switches of two panels, one of each set. The lights are connected by wires $L_a$, $L_b$, $L_c$ and $L_d$ to panels $P_a$, $P_b$, $P_c$ and $P_d$ and by wires $L_1$, $L_2$, $L_3$ and $L_4$ to panels $P_1$, $P_2$, $P_3$ and $P_4$. During operation the switches of the two panels, one of each set, last energized remain closed and complete the circuit through the lamp which indicates the two beams, one of each series, last crossed by the craft. The same circuits control the styluses to indicate on the tape 11 the periods of time during which each lamp circuit has been closed.

The receiving circuits preferably include a band pass filter since it is desirable that the control devices be sensitive only to modulation frequencies outside the audible range. A suitable delay network may also be associated with each receiving circuit so that waves of the selected frequency must impinge upon the receiving circuit for an appreciable length of time before energization of the control elements becomes effective.

The switches and switch actuators of the control panels are shown in Fig. 3 of the drawings which shows control panels $P_1$, $P_2$, and $P_4$, panel $P_3$ being omitted because it is identical with $P_2$. Each receiving circuit has a solenoid 18 mounted on its associated control panel and each solenoid controls the operation of the switches of its panel. The control circuits are connected across lines 20 and 21 and the panels $P_a$ to $P_b$ are identical with panels $P_1$ to $P_4$ except that the connections from lines 20 and 21 to the panels of one set are reverse to those of the other set. The solenoid 18 of each of the panels $P_1$ and $P_4$ operates a sliding switch member 22 that carries three contact members 23, 24 and 25. The solenoid 18 of the panel $P_2$ operates a sliding switch member 22a that is identical with the members 22 except that it carries contact members 23 and 24 only. The contact member 23 serves to energize a relay controlling the circuit of one of the lamps G. The contact 24 serves to control a relay opening circuit and the contacts 25 control counter actuating circuits.

The sliding switch members 22 and 22a are connected by wires 26 to the line 21 and are normally held by springs 27 in open positions. The contact members 23 are movable into engagement with contact members 28 to close a circuit from the line 21 through the wire 26 contact members 23 and 28, a wire 29, a relay solenoid 30 and a wire 31 to the line 20. The solenoid 30 operates a normally open switch 32 that closes a circuit from line 21 through wire 26, a wire 33, the switch 32, a wire 34, a normally closed switch 35, a wire 36, the solenoid 30 and wire 31 to line 20. The solenoid 30 also operates a switch 37 that when closed connects a lamp circuit wire L to the line 21 through a wire 38 and wire 26. In the series of panels $P_a$ to $P_d$ the switch members 22, 22a are connected to the line 20 instead of 21 so that each lamp circuit is completed through two switches 37, one on a panel of each series.

The relay circuits are so controlled that no two relays of the same series can be closed at the same time, the main switch of each panel operating to open any previously closed relay. Therefore, at any given time all relays of each series except the one controlled by the radio circuit last energized will be open and one lamp circuit will be closed. The closed circuit being that of the lamp positioned to correspond to the intersection of the two beams last crossed by the craft, the course of the craft across each subdivision traversed being indicated by the lamps G successively lit during the passage.

The relay circuits are de-energized by opening the normally closed switches 35 and this is accomplished by means of solenoids 39 that are connected, one to each switch 35. The solenoids 39 are connected in series to the line 20 through the wire 31 of panel P1, a wire 40, intermediate wires 41 and a wire 43 that has parallel connections 44 to contact members 45 that are engaged by the contact members 24 to complete the circuit through the solenoids 39 during the closing movement of any one of the sliding switch members 22 or 22$^a$ before engagement of the contact member 23 with the contact member 28.

The contact members 45 are pivoted trip members that make contact only during the closing movement of the switch members. As shown in Fig. 4 the member 45 has a body portion 46 of insulating material and is pivotally mounted on a fixed supporting member 47. The member 45 is engaged by a leaf spring 48 that normally holds the member in upright position. The member 45 has a pointed top that is in the path of movement of the contact member 24 and is provided with a contact plate 49 on the side thereof toward which the contact member moves when the switch member is actuated by the solenoid 18. As the switch member moves toward circuit closing position, the contact 24 engages the plate 49 and completes the circuit from the line 21 through the wire 26, contacts 24 and 45, wire 44, solenoids 39 and wires 41, 40 and 31 to line 20, breaking all the relay circuits of the series. After the contact member 24 has passed the contact member 45 the relay of the energized panel is closed by engagement of contacts 23 and 28. The relay so energized stays energized until another radio circuit of the series is energized by crossing another of the controlling beams. Upon the return movement of the contact member 24 after deenergization of the solenoid 18 it engages the side of the member 45 opposite that which carries the contact plate 49 so that no electrical contact is made.

As the lights G are lighted the corresponding styluses 13 are actuated to record the course of travel on the tape 11.

On each of the panels that are controlled by border beams such as the panels P1 and P4 in Fig. 3 the switch member 22 is provided with the additional contact member 25, that engages with a pivoted contact member 50 that may be identical with the contact member 45, the member 50 being positioned closer to the contact member 25 so that the contact 25 engages the contact 50 before the contact 24 engages the contact 45.

The contact 50 of panel P1 is connected through a wire 51, the "east" counter, a wire 52, the wire 33 of panel P4, the switch 32, the wire 34, the switch 35, the wire 36, the solenoid 30 and the wire 31 to the line 20. The contact 50 of panel P4 is connected through a wire 53 the "west" counter, a wire 54, the wire 33 of panel P1, the switch 32, the wire 34, the switch 35, the wire 36, the solenoid 30 and the wire 31 to the line 20. If the relay of panel P4 is closed when the control switch of panel P1 is operated by the solenoid 18, the "east" counter is energized. If the relay of panel P1 is closed when the switch of panel P4 is operated the "west" counter is energized. The counter circuits can be energized only when the craft passes from one border beam to another of the same series without crossing intermediate beams. Referring to Fig. 1, it will be seen that this can happen only when the craft passes across one of the gaps C or D. Assuming that one of the gaps C is crossed by the craft traveling in an easterly direction, it will be apparent that the beam 4 is first crossed and then the beam 1. Crossing the beam 4 will close the relay on panel P4 and crossing the beam 1 will complete the circuit for the "east" counter. In passing over the same gap traveling west the $a$ beam will energize the relay of panel P1 and actuation of the switch on panel P4 will complete the circuit for the "west" counter.

The "north" and "south" counters are connected in exactly the same way between panels P$_a$ and P$_d$. The four markers 16 in the circuits of the four counters as shown in Fig. 2 will be actuated with the counters to indicate the direction of each crossing on the tape 11.

Figure 6:
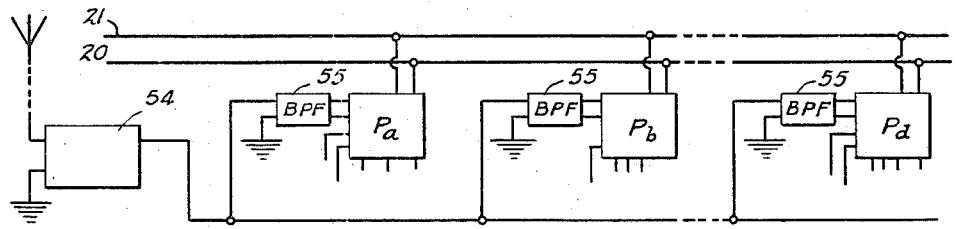
Fig. 6 is a diagrammatic view showing a modified form of radio control.

In the system as illustrated herein beams of four frequencies are employed in each series. As shown in Fig. 3, three frequencies in each series are all that are essential. Since all of the intermediate panels are identical, as many frequencies in excess of three as desired may be employed in each of the two series. It is not essential that the same number of beams be provided in each series. If the number of beams in one series is greater than those in the other, the subdivisions will be rectangular instead of square, but the operation will be the same. The beams of one series need not cross the beams of the other series at right angles, and the beams of one or both of the series may be divergent it being only necessary that the two series of beams be so related that their intersections will define definite quadrilateral areas. It is to be understood that the term "frequency" as applied to the radio beams is intended to refer either to radio frequency or modulation frequency. The radio beams, may, if desired, all be of the same radio frequency but with modulations of different frequencies, in which case a single radio receiver 54 having its output connected in parallel to the band pass filters 55 may be employed, as shown in Fig. 6 each one of the band pass filters 55 being tuned to pass only one of the modulations.

In addition to operating the lamps and recording tape the control mechanism may be utilized to graphically indicate the geographical position of the craft and the direction from the craft of any desired number of stations with which it may be desired to establish radio communication or to which the craft may be traveling. Geographical position is indicated by a member that has a movement with respect to a dial that corresponds to the movement of the craft with respect to the earth's surface. The direction indicating devices may be in the form of pointers controlled by the moving member which indicate on the dial the direction of selected stations so that the directional receiving or transmitting antennae of the craft may be properly positioned with respect to a desired station.

As shown in Figs. 7 to 10, the pointer actuating mechanism is mounted upon a dial plate 60 which may if desired be mounted to turn about a central pivot 61 to permit the dial to be oriented so that the pointers will point in the true direction. However, the angular direction will be indicated on the dial regardless of the actual position of the dial with respect to the compass.

Figure 7:
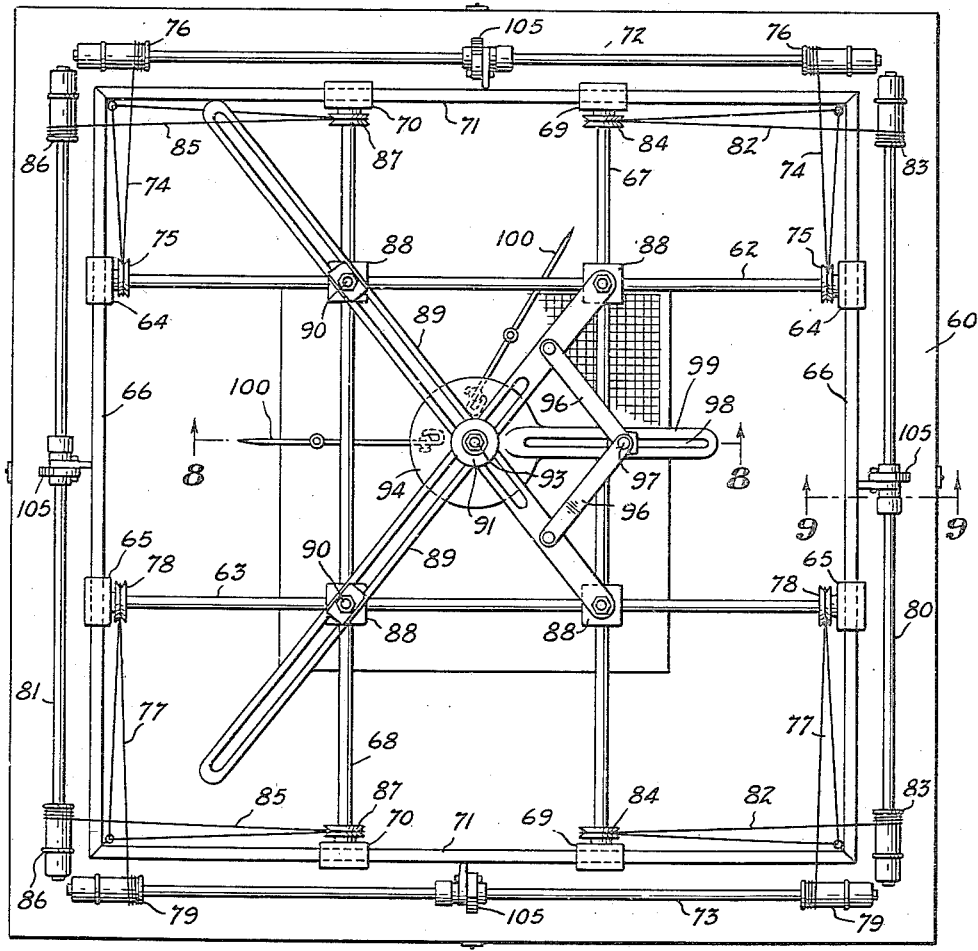
Fig. 7 is a plan view of the graphic position indicator.
Figure 8:
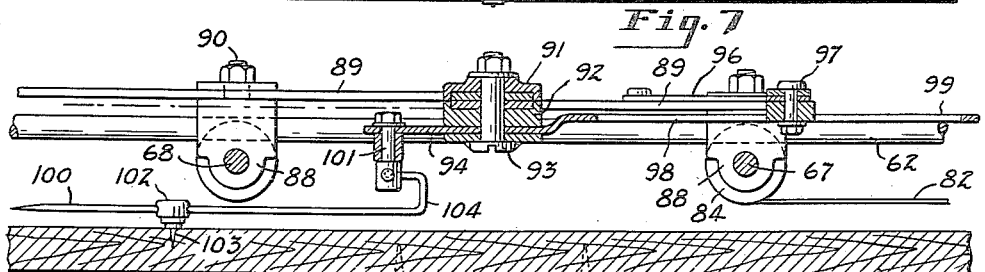
Fig. 8 is a section taken on the line indicated at 8—8 in Fig. 7.
Figure 9:
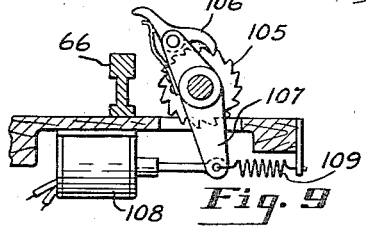
Fig. 9 is a detail view showing one of the ratchets and its solenoid actuator.
Figure 10:
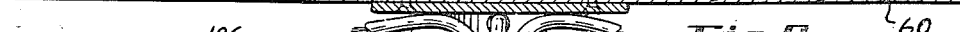
Fig. 10 is a detail view showing one of the swiveled pointer guides.

As shown in Fig. 7 two parallel bars 62 and 63 are mounted on runners 64 and 65 that slide on tracks 66 on the dial plate 60 at right angles to the bars. Two parallel bars 67 and 68 at right angles to the bars 62 and 63 are mounted on runners 69 and 70 to slide on tracks 71 on the dial plate 60 at right angles to the bars. Shafts 72 and 73 are mounted on the dial plate 60 at opposite sides thereof parallel to the bars 62 and 63. Cables 74 anchored at one end to the dial plate 60 pass over pulleys 75 on the bar 62 to drums 76 on the shaft 72. Cables 77 anchored at one end to the dial plate 60 pass over pulleys 78 on the bars 63 to drums 79 on the shaft 73. Shafts 80 and 81 are mounted parallel to the bars 67 and 68 at opposite sides of the dial plate. Cables 82 extend from drums 83 on the shaft 80 over pulleys 84 on the bar 67 to an anchor on the dial plate. Cables 85 extend from drums 86 on the shaft 81 over pulleys 87 on the bar 68 to an anchor on the dial plate. By means of the shafts 72, 73, 80 and 81, the bars 62, 63, 67 and 68 may each be independently moved. At the points where the bars 62 and 63 cross the bars 67 and 68, slide blocks 88 are mounted, each block having two holes at right angles to receive the crossing bars. Two straight slotted bars 89 are pivoted, one to each of two blocks 88 that slide on one of the crossing bars, and are guided by studs 90 mounted in diagonally opposite blocks 88 and engaging in the slots of the bars 89. At the crossing point of the two bars 89 two blocks 91 and 92 are slidably mounted on the bars 89 and are connected together by a central pivot 93 that passes through the slots of the bars 89 and is disposed at all times at the intersection of the diagonals of the rectangle formed by the crossing bars 62, 63, 67 and 68. A disk 94 is supported beneath the block 92 by the pivot 93 and is held against angular movement with respect to the dial plate 60 by means of links 96 pivoted to the bars 89 at equal distances from the pivoted ends thereof and connected together by a pivot 97 that slides in a slot 98 in an arm 99 attached to the disk 94. Pointers 100 are connected at any desired points to the disk 94 by pivots 101 and each is guided by a swiveled eyelet 102 that may be mounted on a thumb tack 103 that may be secured at any desired point on the dial plate 60. The pointers 100 are preferably provided with curved inner ends 104 that will permit the swivel eyelet 101 to occupy a position directly beneath the pivot 101. Each of the four shafts 72, 73, 80 and 81 is provided with a ratchet wheel 105 that may be operated step by step by a pawl 106 carried by a lever 107 that is actuated by a solenoid 108 and an opposed spring 109. Wires for energizing the solenoids 108 may be led to the bottom of the plate 60 through the pivot 61 so as not to interfere with the orienting of the dial plate.

Figure 11:
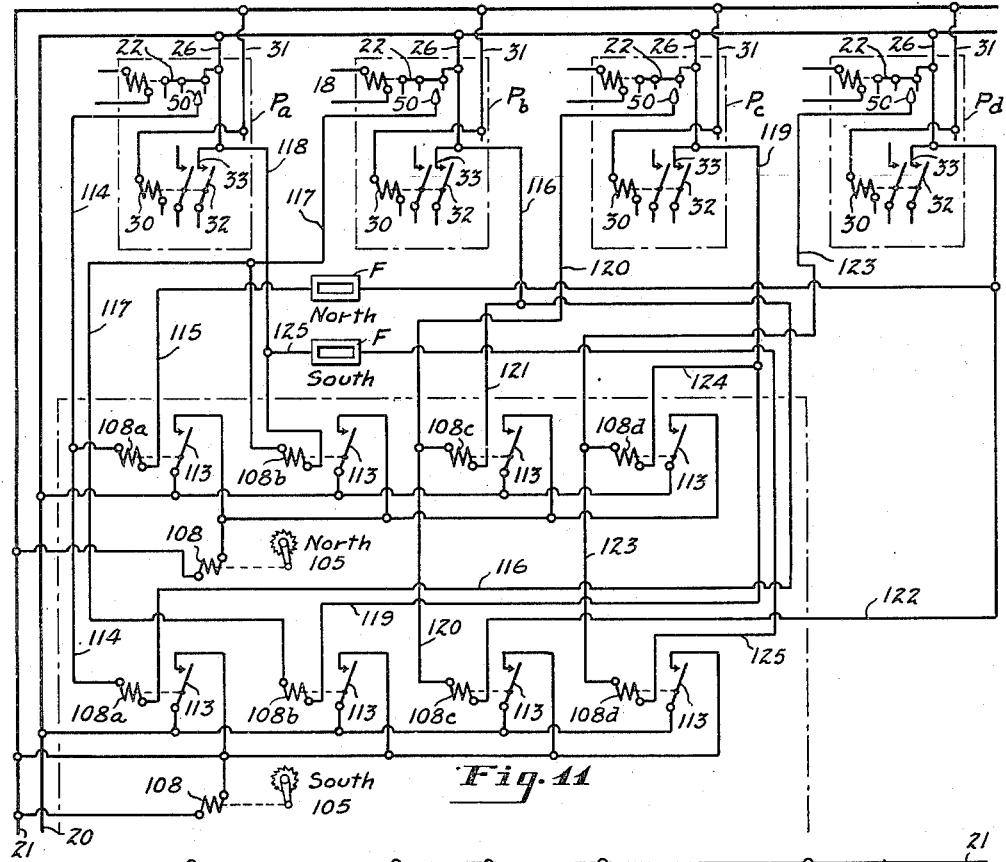
Fig. 11 is a wiring diagram showing the actuating circuits for the solenoids of the graphic indicator.

The solenoids 108 are in circuits controlled by the radio receiving circuits, as shown in Fig. 11, so that the bars 62, 63, 67 and 68 are moved north, south, east and west a predetermined distance upon each passage of the craft across a space between successive parallel radio beams. Since the movement of the disk 94 is with the intersection of the diagonal bars 89, each point on the disk will have a movement with respect to the face of the dial plate 60 that is equal to one half of the algebraic sum of the north and south movements of the bars 62 and 63 and of the east and west movements of bars 67 and 68, and, which, therefore corresponds to movements of the craft with respect to the earth's surface.

The solenoids 108 are in circuits selectively controlled in the same manner as the circuits of the counters F above described. The counter circuits shown in Fig. 3 could be employed but it is preferable that a movable bar of the indicating device be actuated each time the craft crosses a space between any two successive parallel radio beams so that the disk 94 will have movements corresponding to that of the craft across the individual subdivisions. This requires a slight alteration of the control circuits which is illustrated in Fig. 11. As shown in Fig. 11, a sliding switch member 22 having three contact elements is provided on the intermediate panels $P_b$ and $P_c$ as well as on the panels $P_a$ and $P_d$. Each one of the solenoids 108 is energized by means of any one of four solenoids $108_a$, $108_b$, $108_c$, and $108_d$ that operate switches 113 connected in parallel between one terminal of the solenoid 108 and the power line. "North" and "south" solenoids 108 are shown in Fig. 11 and the solenoids $108_a$ to $108_c$ associated with the two solenoids 108 are referred to as "north" and "south" solenoids.

The contact 50 of the panel $P_a$ is connected by a wire 114 to one terminal of the "north" solenoid $108_a$ and to one terminal of the "south" solenoid $108_a$. The opposite terminal of the "north" solenoid $108_a$ is connected by a wire 115 with the wire 33 of the relay on the panel $P_d$, and the opposite terminal of the "south" solenoid $108_a$ is connected by a wire 116 to the wire 33 of the relay of the panel $P_b$.

The contact 50 of the panel $P_b$ is connected by a wire 117 to one terminal of the "north" solenoid $108_b$ and with one terminal of the "south" solenoid $108_b$. The opposite terminal of the "north" solenoid $108_b$ is connected by a wire 118 to the wire 33 of the relay on the panel $P_a$ and the opposite terminal of the "south" solenoid $108_b$ is connected by a wire 119 to the wire 33 of the relay on the panel $P_c$.

The contact 50 of the panel $P_c$ is connected by a wire 120 with one terminal of each of the "north" and "south" solenoids $108_c$. The opposite terminal of the "north" solenoid $108_c$ is connected by a wire 121 with the wire 33 on the panel $P_b$ and the opposite terminal of the "south" solenoid $108_c$ is connected by a wire 122 to the wire 33 of the panel $P_d$.

The contact 50 of the panel $P_d$ is connected by a wire 123 to one terminal of each of the "north" and "south" solenoids $108_d$. The opposite terminal of the "north" solenoid $108_d$ is connected by a wire 124 to the wire 33 of the panel $P_c$ and the opposite terminal of the "south" solenoid $108_d$ is connected by a wire 125 to the wire 33 of the panel $P_a$.

The "east" and "west" solenoids 108 are controlled from panels $P_1$, $P_2$, $P_3$ and $P_4$ in exactly the same way as the "north" and "south" solenoids 108 are controlled from the panels $P_a$, $P_b$, $P_c$ and $P_d$.

Each time the craft crosses one of the controlling radio beams one or the other of the two circuits controlled by the contact 50 of the energized panel will be energized unless the energization is caused by a second crossing of the same beam while the relay of the panel controlled by that beam is still closed, in which case no circuit is completed through the contact 50. Whenever the craft crosses the beam $a$ traveling north from the beam $d$ to the beam $a$, a circuit will be completed from line 20 through wire 26, contact 50, wire 114, "north" solenoid $108_a$, wire 115 to wire 33 of the relay on panel $P_d$ and through the relay to wire 31 and line 21 causing an actuation of the "north" solenoid 108. If the craft crosses the beam a traveling south from the beam b, a circuit will be completed from line 20, through wire 26, contact 50, wire 114, "south" solenoid 108a, wire 116, to wire 33 of the relay of the panel P<sub>b</sub> and through the relay to wire 31 and line 21, causing an actuation of the "south" solenoid 108.

Similar circuits are completed through the contact 50 of each of the panels P<sub>b</sub>, P<sub>c</sub> and P<sub>d</sub> and the "north" and "south" solenoids 108b, 108c and 108d to register each passage across the space between successive beams and the direction thereof.

The face of the dial plate 60 may be sectioned by lines parallel to bars 62, 63, 67 and 68 and spaced apart a distance equal to the movement of the disk 94 upon each actuation of a ratchet 105.

The pointing mechanism may be set at any desired time or place for example before leaving the home station. Assuming a pointer center to be the position of the craft at the time the setting is made, it will be apparent that the point on the dial plate corresponding to the position of any station within the area covered by the beams may be readily located. The pointer guiding eyelet will be positioned at such point and since the movements of the disk 94 with respect to the dial plate 60 correspond to the movements of the craft with respect to fixed points on the earth's surface, the pointer will continue to point to the station for which it is set. If the station to which the pointer is directed is the destination of the craft, the eyelet guide will be directly below the pointer pivot and the pointer will swing freely when the craft arrives at its destination. Also if the eyelet 102 is set with its swivel in axial alinement with the pivot 101 at the home station, the pointer will be directed to the home station until the device is reset.

The movement of the disk 94 with respect to the dial 60 upon each actuation corresponds to the movement of the craft through a space between successive radio beams and the travel of the disk 94 across the dial plate corresponds to the travel of the craft over the earth's surface. It will be apparent therefore that if a map drawn to the proper scale of the region in which the craft is traveling be fixed to the plate 60, a pointer held in fixed position with respect to the disk 94 may be positioned to indicate the position of the craft on the map.

The pointing device will enable the operators of the traveling craft to quickly orient their radio apparatus with respect to desired stations other than those to which the pointers 100 are directed. Knowing the position of such a station with respect to one of the stations for which one of the eyelets is set, its direction from the craft may be determined by measuring its angular position with respect to the pivot of the pointer. The device will, therefore, enable the operators on a traveling craft to quickly orient radio sending or receiving apparatus to any desired station and will assist in determining the course of travel.

The north counter F may be connected in the line 115, the south counter in the line 125 and the east and west counters may be correspondingly placed in the circuits controlled by panels P<sub>1</sub> to P<sub>4</sub>.

Figure 12:
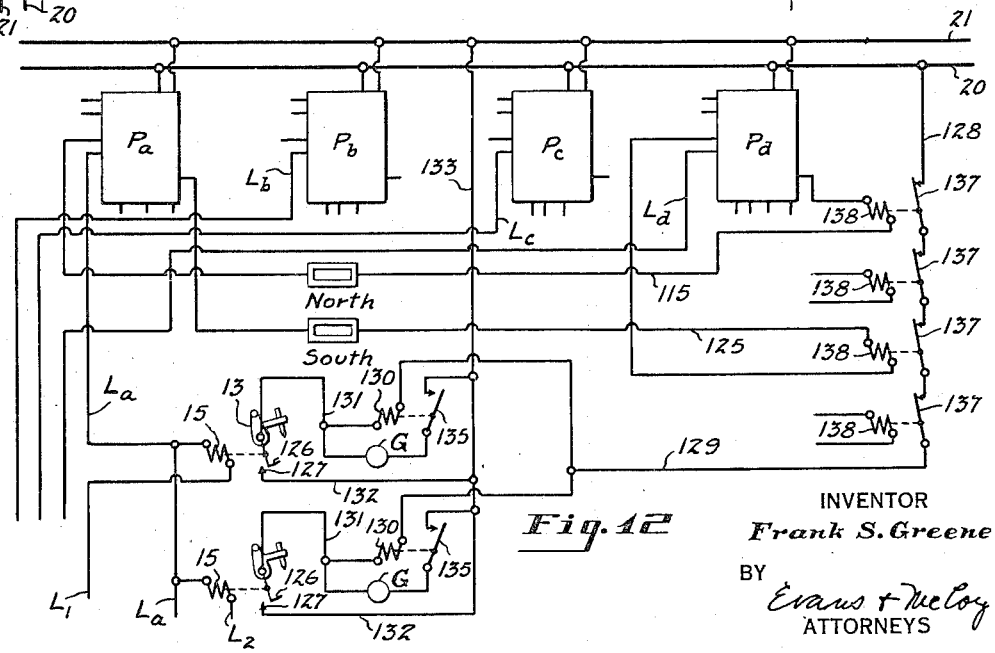
Fig. 12 is a wiring diagram showing modified lamp control circuits.

If it be desired to keep each light that is lit on the panel G lighted until another subdivision is entered in order to provide a visual indication of the direction and course of travel of the craft across each subdivision, this may be accomplished by the modification of the light and stylus controlling circuits shown in Fig. 12. Referring to Fig. 12, each of the sixteen stylus actuating solenoids 15, two of which are shown, has its terminals connected to one of the wires L<sub>a</sub> to L<sub>d</sub> and to one of the wires L<sub>1</sub> to L<sub>4</sub>, as in the modification previously described. The lights, however, are in relay circuits controlled by the solenoids 15. Each stylus 13 carries a brush contact 126 that engages a stationary contact 127 and completes a circuit from line 20 through a line 128, wire 129, a relay solenoid 130, a wire 131, the contacts 126 and 127 and wires 132 and 133 to line 21. Energization of the solenoid 130 closes a relay switch 135 and closes a circuit from line 20 through wires 128, 129, solenoid 130, a light G, the switch 135, and wire 133 to line 21. The stylus operating solenoids each will remain energized until one of the two panel relay switches in series with it is opened. The associated lamp however will remain lit until its relay circuit is broken. The lamp relay circuits may be controlled by four normally closed switches 137 in the line 128, each adapted to be opened by a solenoid 138 connected in one of the counter circuits to be energized upon passage of the craft from one subdivision to another. As shown in Fig. 12, one of the solenoids 138 is in the line 115 that connects the north counter to the panel P<sub>d</sub> and another is connected in the line 125 that connects the south counter to the panel P<sub>a</sub>. The other two solenoids 137 are connected in the corresponding counter circuits controlled by the panels P<sub>1</sub> to P<sub>4</sub>. One of the solenoids 138 will be energized upon each passage of the craft from one subdivision to another to open all of the light relay circuits.

If a visual indication of the course of travel over a distance greater than the distance across a subdivision is desired, a suitable stylus attached to the disk 94 will trace the course upon a map secured against the face of the dial plate 6D.

If a more exact indication of position is desired one or more additional systems of crossing beams may be employed which have their beams interposed between the beams of the first series as is indicated on the subdivision marked B<sub>2</sub> in Fig. 1 and additional control panel sets may be provided on the craft to register travel with respect to the beams of the additional systems. The sets of lights controlled by all of the control panel sets may be placed upon a single panel positioned as indicated by the intersections between the crossing beams of each system on the subdivision B<sub>2</sub> in Fig. 1.

By means of the control circuits herein described the radio receiving circuits may be made to control four separate and distinct position indicating devices, namely the counters, the bank of lights, the recording device and the graphic indicator. It will be apparent that any one of the indicating devices may be employed alone or that two or more of the indicating devices may be combined.

If desired four counters may be employed that will each register all crossings in a given direction across spaces between parallel beams. Such movements of the craft are registered on the graphic indicating device by means of the control circuits shown in Fig. 11. If it be desired to register these movements by means of counters rather than by means of the disk 94, each of the solenoids 108 may actuate a counter.

If five or more radio frequencies be employed in each series the travel indicating elements may be so controlled as to automatically compensate for the failure of any individual receiving circuit.

If seven radio frequencies be employed the failure of any single circuit or any two circuits that are normally energized successively may be compensated for. Such compensation is particularly desirable for maintaining the accuracy of the graphic indicator which would normally be adversely affected by the failure of any radio receiving circuit due to a defect in the circuit or failure of a beam transmitter. The compensation for skipping single beams may be obtained by registering any passage in either direction across the space between alternate beams without energization of the receiving circuit tuned to the intermediate beam and imparting to the indicator twice the movement that would normally have been imparted thereto upon energization of a radio receiving circuit.

Similar compensation may be provided for the skipping of two or more successive beams.

In Figs. 13 to 15 of the drawings a control system for the graphic indicator is shown in which seven control panels Pa—Pg are employed for registering north and south movements, it being understood that identical means may be employed for registering east and west movements. As shown in Fig. 13 the shafts 72 and 73 are each provided with two ratchets 150 and 151 in addition to the ratchet 105. The solenoids 108 operating the ratchets 105 are controlled by switches on panels 152 and 153 that are operated by solenoids 108a—108g on each panel controlled by the contacts 50 of the panels Pa to Pg in the manner illustrated in Fig. 14. The "north" solenoid 108 is energized upon the closing of any one of the seven solenoid operated switches 113 on the panel 152 and the south solenoid 108 is energized upon the closing of any one of the seven switches on the panel 153, the solenoids 108a—108g of panels 152 and 153 being connected to the panels Pa and Pg in the manner shown in Fig. 11. The ratchet 150 on the shaft 72 is operated by a solenoid 154 controlled by switches on a panel 155 and the ratchet 150 on the shaft 73 is operated by a solenoid 156 controlled by switches on a panel 157. The ratchet 151 on the shaft 72 is operated by a solenoid 158 controlled by switches on a panel 159 and the ratchet 151 on the shaft 73 is operated by a solenoid 160 controlled by switches on a panel 161.

The contact 50 of each of the seven control panels Pa—Pg is connected by a wire 162 to one terminal of one of the solenoids 108a—108g of each of the panels 152 and 153 and the relay wire 33 of each of the panel Pa—Pg is connected by a wire 163 to the opposite terminal of one of the solenoids 108a—108g of each of the panels 152 and 153. The contact 50 of panel Pa is connected through one of the wires 162, with solenoid 108a of panel 152 and one of the wires 163 to the relay wire 33 of panel Pg and through a wire 162, south solenoid 108a of panel 153 and a wire 163 to the relay wire 33 of panel Pb. The contacts 50 of the other control panels are each similarly connected through a solenoid on each of the switch panels 152 and 153 so that travel across each space between successive beams in a north or south direction is registered by actuation of one of the solenoids 108. In normal operation the shafts 72 and 73 are actuated by the solenoids 108 only.

The switch panels 152 and 153 are identical, each having seven solenoid operated switches connected in parallel between wires 164 and 165 connecting one terminal of the solenoids 108 with the power line as shown in Fig. 14 so that closing of any one of the switches on the panel 152 will energize the "north" solenoid 108 and closing any one of the switches on the panel 153 will energize the "south" solenoid 108. The solenoids 108a—108g of the panel 152 are connected between contacts 50 of the individual control panels and relay wires 33 of panels controlled by the next beam to the south of that causing energization of the contact 50 in the manner shown in Fig. 11.

The switch panels 155, 157, 159 and 161 are each identical with the switch panels 152 and 153. Solenoids 154 and 158 are connected in parallel with "north" solenoid 108 between lines 164 and 166 and solenoids 156 and 160 are similarly connected in parallel with "south" solenoid 108.

The contact 50 of each control panel is connected through wires 162, and 163, and one of the switch operating solenoids of the panel 155 to the relay wire 33 of the panel that is energized by the beam located two spaces to the south of the beam that causes actuation of the contact member 50, and through wires 162 and 163 and one of the switch operating solenoids of the panel 157 to the relay wire 33 of the panel that is energized by the beam located two spaces to the north of the beam that causes actuation of the contact member 50.

The contact member 50 of each control panel is connected through wires 162 and 163 and one of the switch operating solenoids of the panel 159 to the relay wire 33 of the control panel that is energized by the beam three spaces to the south of the beam that causes actuation of the contact 50, and through a switch operating solenoid on the panel 161 to the relay wire 33 of the panel that is energized by the beam three spaces to the north of the beam that causes actuation of the contact 50.

The solenoids 154 and 156 are energized only when one of the beams has been crossed without energizing the circuit tuned to the frequency of that beam. The solenoid 158 and 160 are energized only when two successive beams have been crossed without energizing either of the circuits on the craft tuned to the frequency of those beams.

The ratchets 150 and 151 are so operated that each ratchet 150 imparts upon each actuation, a movement to its shaft that is twice that imparted by an actuation of the associated ratchet 105 and each ratchet 151 imparts to its shaft upon each actuation, a movement three times that imparted by an actuation of the associated ratchet 105. For example the solenoid 108 may move the ratchet 105 one tooth space, the solenoids 154 and 156 may each move its ratchet 2 tooth spaces and the solenoids 158 and 160 may each move its ratchet three tooth spaces.

The contact 50 of the panel Pa is connected through the switch panel 152 to the relay of the panel Pg, through the switch panel 153 to the relay of the panel Pb, through the switch panel 155 to the relay of the panel Pf, through the switch panel 157 to the relay of the panel Pc, through the switch panel 159 to the relay of the panel Pe, and through the switch panel 161 to the relay of the panel Pd. The contact 50 of the panel Pa is thus provided with a separate connection to the relay of each of the other panels, each causing energization of a different solenoid. Each of the other contacts 50 is similarly connected. Fig. 13 shows a control system in which all of the possible connections are utilized. It will be apparent, however, that removal of the switch panels 159 and 161 and the ratchets 151 would not in any way affect the operation of the ratchets 105 and 150, and that, if all the switch panels except 152 and 153 were removed the system would be the same as that illustrated in Fig. 11. In the seven frequency system illustrated, the skipping of a single beam or of two successive beams may be compensated for by utilizing all of the possible connections from the contact 50 of each panel to the relays of the other panels. By utilizing a greater number of frequencies the number of skips that can be compensated for may be increased. If $2n+1$ frequencies are employed any skips up to and including $n-1$ successive skips may be compensated for. It is not necessary that the number of frequencies be an odd number since it is not necessary that the contact 50 of each panel be connected to the relays of all other panels. In the seven frequency system illustrated the skipping of three, four or five successive beams while traveling north would result in an actuation of one of the south solenoids which would give a movement to the indicator in a direction opposite that of actual travel. It is apparent therefore, that likelihood of error may be reduced by increasing the number of frequencies employed. When $2n+1$ frequencies are employed there may be failure of as many as $2n-2$ control units, provided no more than $n-1$ successive beams are skipped.

The automatic compensating system illustrated in Fig. 13 facilitates the coverage of a large area by beams from a single row of transmitting stations. Powerful beams may be alternated with relatively weak beams so that the weaker beams will be skipped in portions of the control area remote from the sending stations.

It is to be understood that variations and modifications of the specific device herein shown and described for purposes of illustration, may be made without departing from the spirit of the invention.

What I claim is:

1. A position indicating system for craft traveling over a portion of the earth's surface which comprises means for transmitting two series of radio beams with the beams of the two series differing in frequency and the beams of one series intersecting the beams of the other to provide a checkerwork area over said portion of the earth's surface, the beams of each series having a predetermined number of frequencies which recur in regular sequence, a series of radio receiving circuits on a craft traveling in said checkerwork area which are tuned, one to each of the beam frequencies, and means controlled by sequential energizations of said circuits for indicating the intersection of the two beams, one of each series, last crossed by said craft.

2. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, means controlled jointly by radio receiving circuits tuned to the frequencies of the beams of one series and receiving circuits tuned to the frequencies of the beams of the other series for indicating the intersection of the two beams, one of each series, last crossed by the craft in the subdivision in which the craft is traveling, and means controlled by said receiving circuits for indicating passage from one subdivision to another.

3. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, elements successively operated by said receiving circuits as they are energized, and means controlled by said elements for indicating the direction and path of travel of the craft.

4. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, elements successively operated by said receiving circuits as they are energized, means controlled by said elements for indicating the direction and path of travel of the craft, and means controlled by said elements for registering passages from one subdivision to another.

5. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, elements successively operated by said receiving circuits as they are energized, a series of signaling circuits, control switches in said circuits, and means controlled by said receiving circuits for operating said switches.

6. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, elements successively operated by said receiving circuits as they are energized, a series of electric circuits, means controlled by certain of said circuits for indicating the path of travel of the craft across each subdivision, means controlled by other of said circuits for registering passages of the craft from subdivision to subdivision in each direction transversely of the beams of either series, and switches in said electric circuits controlled by said receiving circuits.

7. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, elements successively operated by said receiving circuits as they are energized, a lamp panel having lamps thereon arranged to correspond to the beam intersections of a subdivision, circuits for said lamps, and switches in said lamp circuits controlled by said receiving circuits.

8. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, and a series of devices, each adapted to indicate the intersection of the two beams, one of each series, last crossed by said craft, and each controlled by two of said receiving circuits tuned to crossing beams.

9. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, and devices for indicating passage from one subdivision to another, each controlled by a pair of receiving circuits tuned to the frequencies of beams of the same series forming opposite borders of a subdivision.

10. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, devices for indicating passage from one beam to another, each controlled by a pair of receiving circuits tuned to the frequencies of said beams, another pair of circuits controlled by each of the first mentioned pairs, and means controlled by the last mentioned pairs of circuits for indicating distance traveled in each of four directions.

11. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, means for indicating the path of travel of the craft across each subdivision comprising signals, each controlled by two of said receiving circuits, one tuned to a beam of one series and the other tuned to a beam of the other series, and devices for indicating passage from one subdivision to another, each controlled by a pair of receiving circuits tuned to the frequencies of beams of the same series forming opposite borders of a subdivision.

12. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, means for indicating the path of travel of the craft across each subdivision comprising signals, each controlled by two of said receiving circuits, one tuned to a beam of one series and the other tuned to a beam of the other series, devices for indicating passage from one subdivision to another, each controlled by a pair of receiving circuits tuned to the frequencies of beams of the same series forming opposite borders of a subdivision, and means controlled by said pairs of receiving circuits for indicating distance traveled in each of four directions.

13. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, separately energized circuits controlled by said receiving circuits, and means operated by said separately energized circuits for recording the course traveled by said craft.

14. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, separately energized circuits controlled by said receiving circuits, position indicating signals operated by said separately energized circuits, and means operated by the latter circuits for recording the course traveled by said craft.

15. A position indicating device comprising a series of differently tuned radio receiving circuits, separately energized circuits, each controlled by a pair of said receiving circuits, and signals controlled by each of said separately energized circuits.

16. A position indicating device comprising differently tuned radio receiving circuits arranged in two series, a signal panel having a number of rows of lamps corresponding to the number of receiving circuits of one series and a number of lamps in each row corresponding to the number of receiving circuits of the other series, a circuit for each of said lamps, and two switches in each circuit, means controlled by a receiving circuit of one series for operating one of said two switches in each lamp circuit and by a receiving circuit of the other series for operating the second of said two switches.

17. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, and two pairs of radio receiving circuits on a traveling craft, the circuits of one pair being tuned to the frequencies of two successive beams of one series and the circuits of the other pair being tuned to the frequencies of two successive beams of the other series, and means selectively controlled by each pair of receiving circuits for indicating sequential energizations of the circuits and the order of the energizations.

18. A position indicating device comprising two pairs of selectively tuned radio receiving circuits, a pair of counters associated with each pair of receiving circuits, and means for counting energizations of each circuit of each pair that follow the energization of the other circuit of the pair to measure travel in four directions.

19. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, and two pairs of radio receiving circuits on a craft traveling in said checkerwork area, the circuits of one pair being tuned to the frequencies of two successive beams of one series and the circuits of the other pair being tuned to the frequencies of two successive beams of the other series, a pair of counters associated with each of said pairs of circuits, and means controlled by each pair of receiving circuits for operating one of the pair of associated counters upon an energization of one of the receiving circuits that follows an energization of the other receiving circuit of the pair and for operating the other counter of the pair upon energization of the same circuits in the reverse order.

20. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, in combination with radio receiving circuits on a traveling craft tuned to the frequencies of said beams, a dial, four elements, each movable in a different direction over said dial, means controlled by said receiving circuits for imparting movements to each of said elements proportional to movements of the craft in a corresponding direction with respect to the earth's surface and means controlled by said movable elements for imparting movements to an indicating element corresponding to movements of the craft with respect to the earth's surface.

21. The herein described method of indicating the position for craft traveling over a portion of the earth's surface which comprises forming a checkerwork of intersecting radio beams over a portion of the earth's surface, said checkerwork being formed by two series of beams, the beams of each series having a predetermined number of frequencies which recur in regular sequence, said frequencies providing a number of combinations at beam intersections equal to the number of frequencies in one series times the number of frequencies in the other series, said combinations dividing the checkerwork area into subdivisions, energizing a tuned radio receiving circuit on the craft upon each passage of the craft across a beam, operating a signal that indicates the intersection of the two beams, one of each series, last crossed by the craft, maintaining the signals so operated to indicate successive positions of the craft and its path of travel, and clearing the signals upon passage of the craft from one subdivision to another.

22. The herein described method of indicating the position for craft traveling over a portion of the earth's surface which comprises forming a checkerwork of intersecting radio beams over 'a portion of the earth's surface, said checkerwork being formed by two series of beams, the beams of each series having a predetermined number of frequencies which recur in regular sequence, said frequencies providing a number of combinations at beam intersections equal to the number of frequencies in one series times the number of frequencies in the other series, said combinations dividing the checkerwork area into subdivisions, energizing a tuned radio receiving circuit on the craft upon each passage of the craft across a beam, operating a signal that indicates the intersection of the two beams, one of each series, last crossed by the craft, counting energizations of each of two circuits controlled by beams of one series that follow the energization of the other, and similarly counting energizations of circuits of the other series to determine distance traveled in each of four directions.

23. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, separately energized lamp signal circuits controlled, each by two radio receiving circuits tuned one to the frequency of a beam of one series and the other to the frequency of a beam of the other series, means for maintaining each lamp circuit after energization, and means controlled by certain of said receiving circuits for deenergizing all lamp circuits.

24. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, whereby the checkerwork area is divided into subdivisions by groups of beam intersections, a series of radio receiving circuits on a craft traveling in said checkerwork area which are tuned, one to each of the beam frequencies, means controlled by said radio receiving circuits for indicating the course of travel across each subdivision, and means controlled by the radio receiving circuits that are energized by border beams for indicating passages from subdivision to subdivision and the direction of such passages.

25. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, means controlled by said receiving circuits, for indicating each passage across a space between successive beams and the direction traveled, and additional means for indicating passages between alternate beams upon failure of the circuit tuned to the intermediate beam.

26. A position indicating system for craft traveling over a portion of the earth's surface which comprises means for transmitting two series of radio beams with the beams of the two series differing in frequency and intersecting to provide a checkerwork of intersecting beams over said portion of the earth's surface, the beams of each series having a predetermined number of frequencies which recur in regular sequence, a series of radio receiving circuits on a craft traveling in said checkerwork area which are tuned, one to each of the beam frequencies, movable indicating elements for indicating travel in four directions, means controlled by the receiving circuits tuned to adjacent beams for actuating said elements upon passage of the craft across a space between successive beams, and means controlled by receiving circuits tuned to non-adjacent beams for imparting proportionally increased movements to said elements upon failure of circuits tuned to intermediate beams.

FRANK S. GREENE.